United States Patent [19]
Fukaya

[11] Patent Number: 5,484,345
[45] Date of Patent: Jan. 16, 1996

[54] COMPACT GEAR REDUCER FOR ROTATION THROUGH AN ANGLE IN EITHER DIRECTIONS

[75] Inventor: Sueo Fukaya, Ohbu, Japan

[73] Assignee: Sumitomo Heavy Industries, Ltd., Tokyo, Japan

[21] Appl. No.: 135,489

[22] Filed: Oct. 13, 1993

[30] Foreign Application Priority Data

Oct. 15, 1992 [JP] Japan .................................. 4-276970

[51] Int. Cl.⁶ ........................... F16H 1/16; F16H 1/32
[52] U.S. Cl. ...................... 475/162; 475/177; 475/178; 74/425
[58] Field of Search ........................... 475/162, 176, 475/177, 178, 228; 74/425

[56] References Cited

U.S. PATENT DOCUMENTS

| | | | |
|---|---|---|---|
| 3,037,400 | 6/1962 | Sundt | 475/178 X |
| 3,709,055 | 1/1973 | Grove | 475/177 |
| 3,735,645 | 5/1973 | Pickles | 74/425 |
| 4,177,695 | 12/1979 | Grove | 475/162 X |
| 4,615,230 | 10/1986 | Guichard | 74/425 X |
| 4,641,887 | 2/1987 | Klueting | 475/162 |
| 4,926,712 | 5/1990 | Stritzel | 74/458 X |
| 4,993,277 | 2/1991 | Adam et al. | 74/425 |
| 5,005,906 | 4/1991 | Suzuki et al. | 475/162 X |
| 5,116,291 | 5/1992 | Toyosumi et al. | 74/425 X |
| 5,123,883 | 6/1992 | Fukaya | 475/178 |
| 5,181,891 | 1/1993 | Pohl et al. | 475/162 |

FOREIGN PATENT DOCUMENTS

| | | | |
|---|---|---|---|
| 0444790A2 | 9/1991 | European Pat. Off. | |
| 3413514A1 | 10/1985 | Germany. | |
| 252935 | 11/1986 | Japan | 475/178 |
| 210642 | 8/1989 | Japan | 475/178 |
| 28549 | 2/1991 | Japan | 475/178 |

OTHER PUBLICATIONS

Mechanism and Dynamics of Machinery, Mabiel & Reinholtz, 4th ed., 1987 John Wiley and Sons, pp. 140–141, 162–164.

*Primary Examiner*—Khoi Q. Ta
*Attorney, Agent, or Firm*—Nikaido, Marmelstein, Murray & Oram

[57] ABSTRACT

A gear reducer for reciprocal rotation wherein the rotation of a motor 1 is transmitted to a worm pinion 4 integrated with an input shaft 2, and is further transmitted to a helical worm wheel 10. The helical worm wheel 10 and an eccentric member 11 are spline coupled to each other, and a pin flange 13 is rotated by a planetary gear structure of a trochoid-tooth-profile inscribing type. Consequently, a pinion shaft (output shaft) 14 integrated with the pin flange 13 rotates, and an outside gear 19 rotates.

8 Claims, 7 Drawing Sheets

FIG. 7
PRIOR ART
(a)
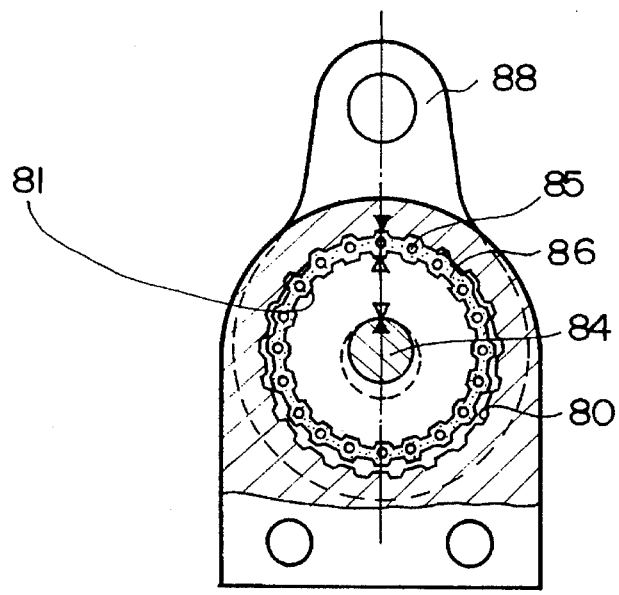
(b)
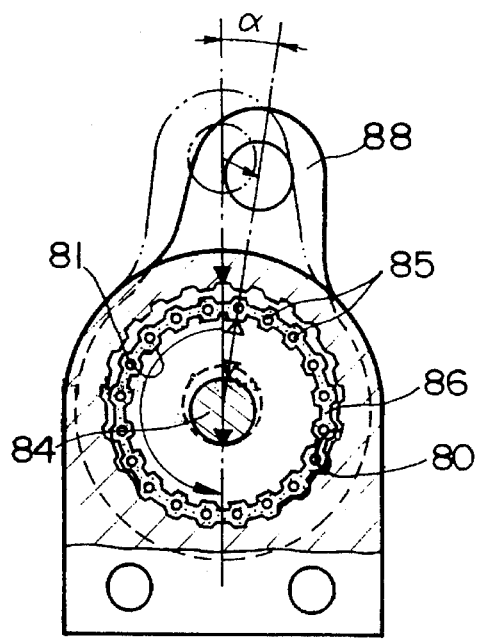
(c)
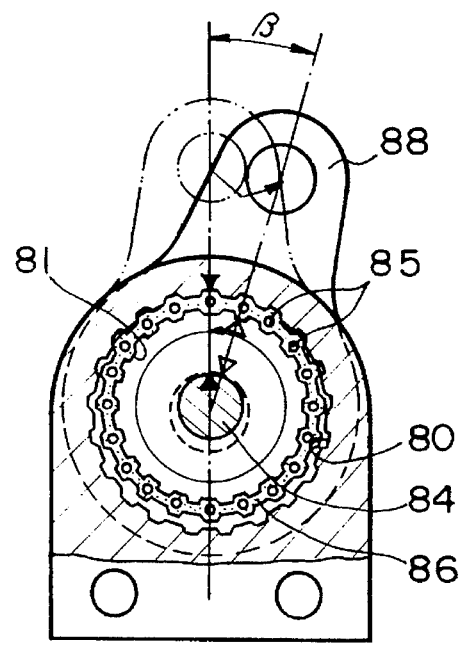

COMPACT GEAR REDUCER FOR ROTATION THROUGH AN ANGLE IN EITHER DIRECTIONS

BACKGROUND OF THE INVENTION

1. Field of the Invention

The present invention relates to a gear reducer for obtaining rotation of an output shaft through a predetermined angle of rotation in either direction by reducing forward and reverse rotation of an input shaft, and more particularly to a gear reducer for rotation which is applicable to, for instance, a reclining mechanism of an automobile seat, a legless chair, or a bed, or an articulating mechanism of an advertising robot whose arm, head or the like oscillates.

2. Description of the Related Art

Conventionally, as a gear reducer of this type, a gear reducer for use in an automobile power seat is disclosed in, for example, Japanese Utility Model Unexamined Publication No. 25055/1991.

This reducer is arranged such that an intermediate shaft having both a worm wheel meshing with a drive-side worm and a worm meshing with a driven-side worm wheel is provided in a worm gear reducing mechanism for effecting speed reduction by means of two or more sets of worm gears.

Japanese Utility Model Unexamined Publication No. 36146/1992 discloses a gear reducer which is similarly used for driving an automobile power seat. This gear reducer is arranged such that an internal gear 80 and an external gear 81, which are disposed eccentrically with each other in the radially inward and outward directions and are provided with different number of teeth, are made to mesh with each other. Meanwhile, as a drive shaft is rotated, either one of these gears 80 and 81 is made to rotate eccentrically by means of an eccentric cam 84, so that either one of the gears 80 and 81 rotates by the difference in the number of their teeth with respect to one revolution of the eccentric cam 84.

This Japanese Utility Model Unexamined Publication No. 36146/1992 also proposes a technique in which a transmission intermediate member 86 capable of undergoing resilient deformation and having a multiplicity of reinforcing members 85 is provided in a meshing portion between the internal gear 80 and the external gear 81.

However, the structure disclosed in the above-described Japanese Utility Model Unexamined Publication No. 25055/1991 has a drawback in that the efficiency drops to a very low level since two or more sets of worm gears, which are inherently low in efficiency, are combined in multiple stages. For this reason, in order to produce (permit) a large torque, it is necessary to increase, for instance, the diameter of a worm shaft, with the result that dimensional restrictions or weightwise restrictions in the specification of worms for securing rigidity become large. In some cases, a reinforcing member or the like for firmly supporting the worm shaft is required.

In addition, since the number of shaft axes becomes three or more, it is difficult to maintain high assembly accuracy, and the structure of a casing and the like becomes complicated.

On the other hand, with the Japanese Utility Model Unexamined Publication No. 36146/1992, component parts which are difficult to be formed as a unit are large in number, so that the assembly is difficult. In addition, there has been a major problem in that an output cannot be obtained by concentric rotation, as shown at (A) to (C) in FIG. 7. Namely, since an output member 88 is directly integrated with the external gear 81 which eccentrically rotates, not only the rotation of the external gear 81 but also the swaying thereof around the eccentric cam are outputted together, making it impossible to obtain a reciprocating motion on a single arc around a specific axis. Hence, it has been inconvenient to use it as a gear reducer of this type.

Moreover, since this structure is not provided with a so-called reverse rotation preventing mechanism, if a strong load is applied from an output side, each gear rotates as a result. Consequently, each time a strong load is applied, the position of a backrest moves slightly, so that there has been a problem which cannot be ignored as a reducer for rotation of this type.

SUMMARY OF THE INVENTION

The present invention has been accomplished in view of the above-described problems, and an object of the present invention is to provide a gear reducer which has high transmission efficiency and high rigidity, facilitates assembly, is provided with a reverse rotation preventing mechanism, and is capable providing specific angular rotary motion on a single arc around a specific axis in either direction.

In accordance with the present invention, the above object is attained by a gear reducer for angular rotation for reducing forward and reverse rotation of an input shaft through so as to obtain rotation of an output shaft a predetermined angle of rotation thereof, the gear reducer comprising: a casing for supporting the input shaft and the output shaft by means of pairs of bearings, respectively; a worm pinion disposed between the pair of bearings on the input shaft so as to rotate with the rotation of the input shaft; a worm wheel disposed between the pair of bearings on the output shaft and meshing with the worm pinion; a planetary gear structure of a trochoid-tooth-profile inscribing type which is disposed between the pair of bearings on the output shaft and located adjacent to the worm wheel, the planetary gear structure including an eccentric member rotating with the worm wheel, an external gear fitted on an outer periphery of the eccentric member and rotating eccentrically, an internal gear secured to the casing and meshing with the external gear in an inscribing manner, and a flange having a function of fetching only a rotating component of the external gear, wherein the flange of the planetary gear structure and the output shaft are coupled to each other.

In the present invention, a basic arrangement is provided such that the input shaft and the output shaft are supported by the casing by means of pairs of bearings, respectively, and all the component members are disposed between these pairs of bearings. As a result, it is possible to increase rigidity, to assemble the members with a small number of assembling errors, and to ensure quiet operation and high reliability.

Specifically, in the present invention, the rotation of the input shaft first rotates the worm pinion, and the rotation of this worm pinion rotates the worm wheel mounted on the output shaft. This rotation is transmitted to the eccentric member constituting an element of the planetary gear structure of a trochoid-tooth-profile inscribing type.

The basic structure of the planetary gear structure of a trochoid-tooth-profile inscribing type itself is already known. That is, as the eccentric member rotates, the external gear fitted on its outer periphery rotates eccentrically. Owing to this eccentric rotation, the external gear sways and rotates around the eccentric member while meshing with the internal gear secured to the casing in an inscribed manner. And, the swaying component is absorbed, and only the rotating component is fetched from the flange.

The rotation of the flange is transmitted to the output shaft.

As is apparent from the above, in the present invention, since the flange and the output shaft undergo only simple rotation (specifically, integral rotation), so that high rigidity can be ensured easily.

In addition, since the output shaft does not sway, and only rotates in forward and reverse directions in a simple way, it is readily possible to obtain the rotation around a specific axis in either direction. Also, it is easy to use the gear reducer thus obtained.

Furthermore, since a worm reducing mechanism is provided, a reverse rotation preventing mechanism can be thereby secured, and even if any strong load is applied from the output side, it is possible to prevent the rotation of the input side due to that load. In other words, the arrangement positively prevents the output shaft from rotating by the load.

Furthermore, since the worm reducing mechanism is disposed on the input side, the high speed rotation of the input shaft at first stage is reduced very quietly and very smoothly.

Since the planetary gear structure of a trochoid-tooth-profile inscribing type is provided on the output side, it is possible to readily ensure high rigidity of the overall reducer, a large torque, a high reducing ratio, and high efficiency. Consequently, it is possible to realize light weight, compact size, and low cost by that portion.

Thus, in accordance with the present invention, in a gear reducer used for a hinge portion for reclining and other reciprocally rotating portions, it is possible to obtain an outstanding advantage of quietness, high rigidity, a large torque, and a high reducing ratio, while being provided with an output of rotation in either direction on a single arc around a specific axis as well as a reverse rotation preventing mechanism. Consequently, it is possible to realize further light weight, compact size, and low cost.

BRIEF DESCRIPTION OF THE DRAWINGS

The above and other objects, features and advantages of the present invention will become more apparent from the following description of the invention taken in conjunction with the accompanying drawings, wherein like reference numerals designate the same or similar parts, and wherein:

FIG. 7A, 7B and 7C are is a cross-sectional view of an example of a conventional gear reducer for reciprocal rotation.

DETAILED DESCRIPTION OF THE PREFERRED EMBODIMENT

Referring now to the accompanying drawings, a detailed description will be given of an embodiment of the present invention.

FIGS. 1 to 6 illustrate an embodiment of a gear reducer for reciprocal rotation used for a power seat of an automobile.

Figure 1:
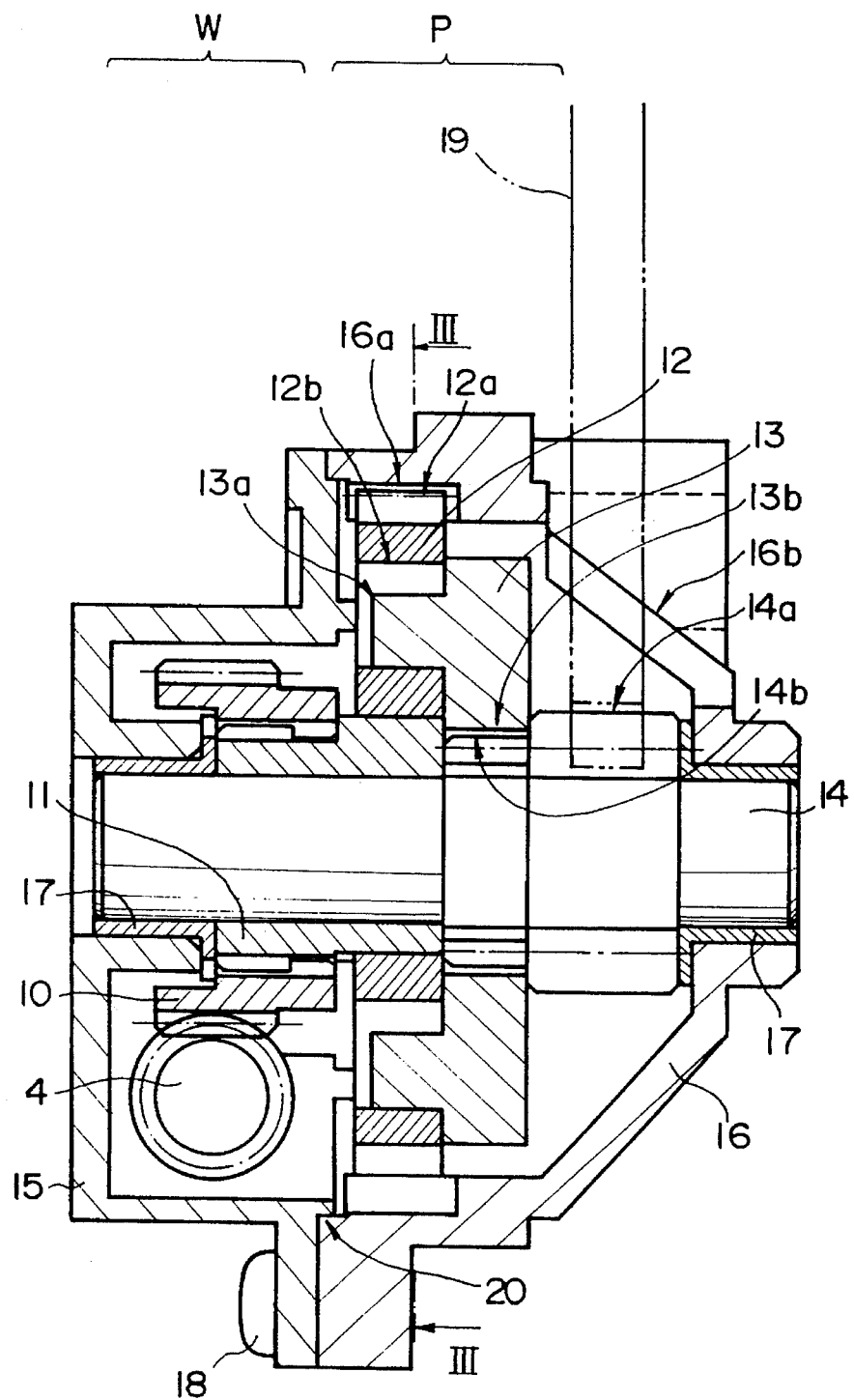
FIG. 1 is a cross-sectional view taken along line I—I of FIG. 4, illustrating an embodiment of a gear reducer for reciprocal rotation to which the present invention is applied.
Figure 2:
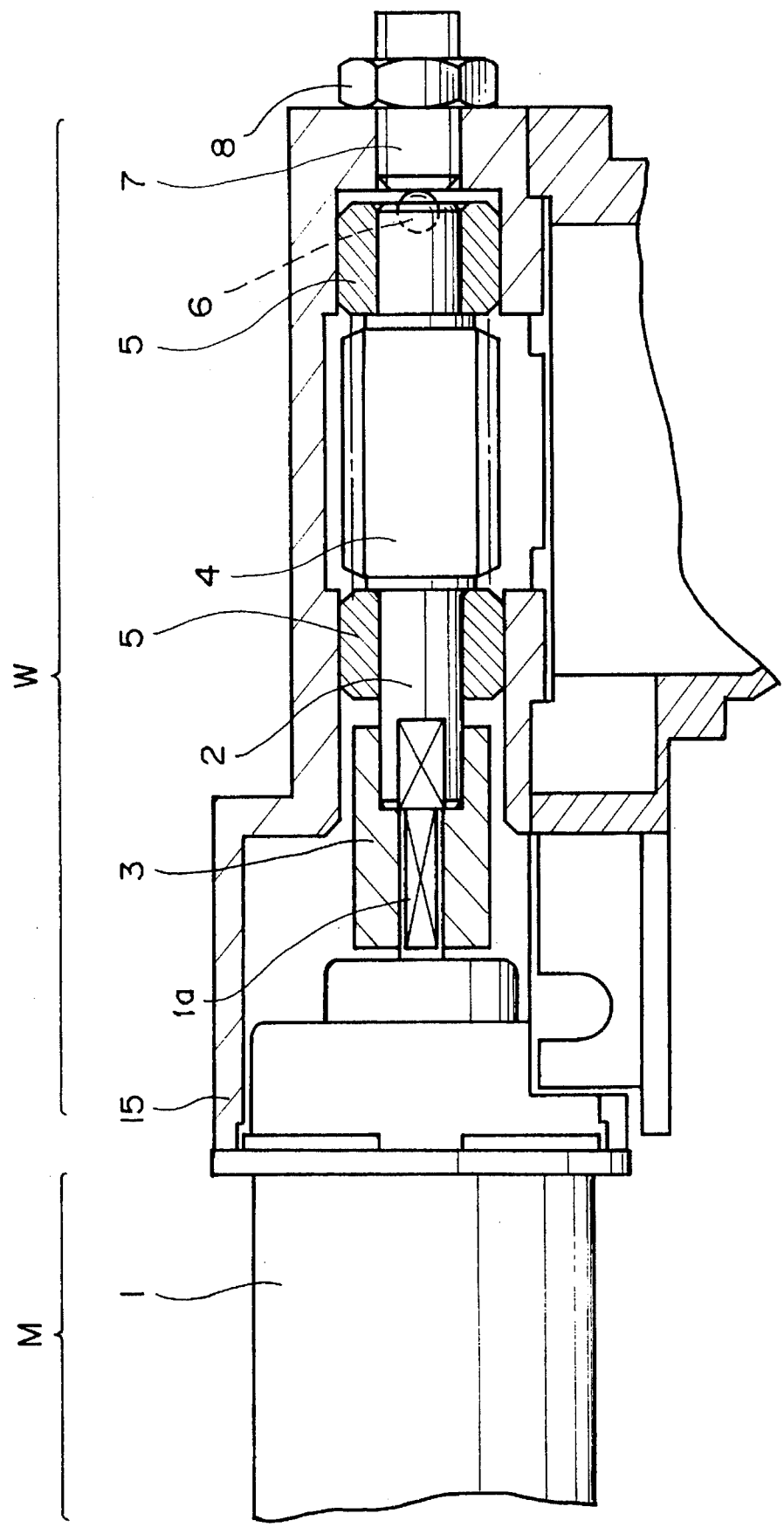
FIG. 2 is a cross-sectional view taken along line II—II of FIG. 4.
Figure 3:
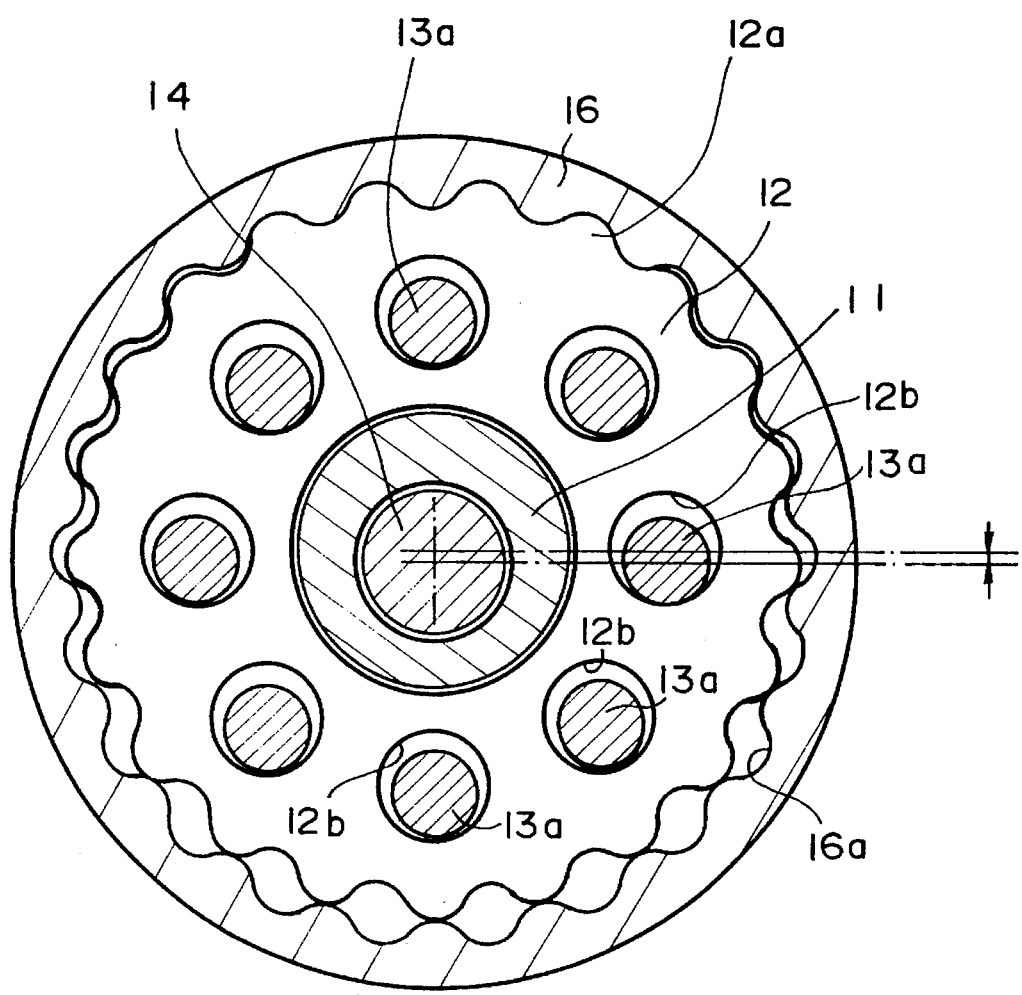
FIG. 3 is a cross-sectional view taken along line III—III of FIG. 1.
Figure 4:
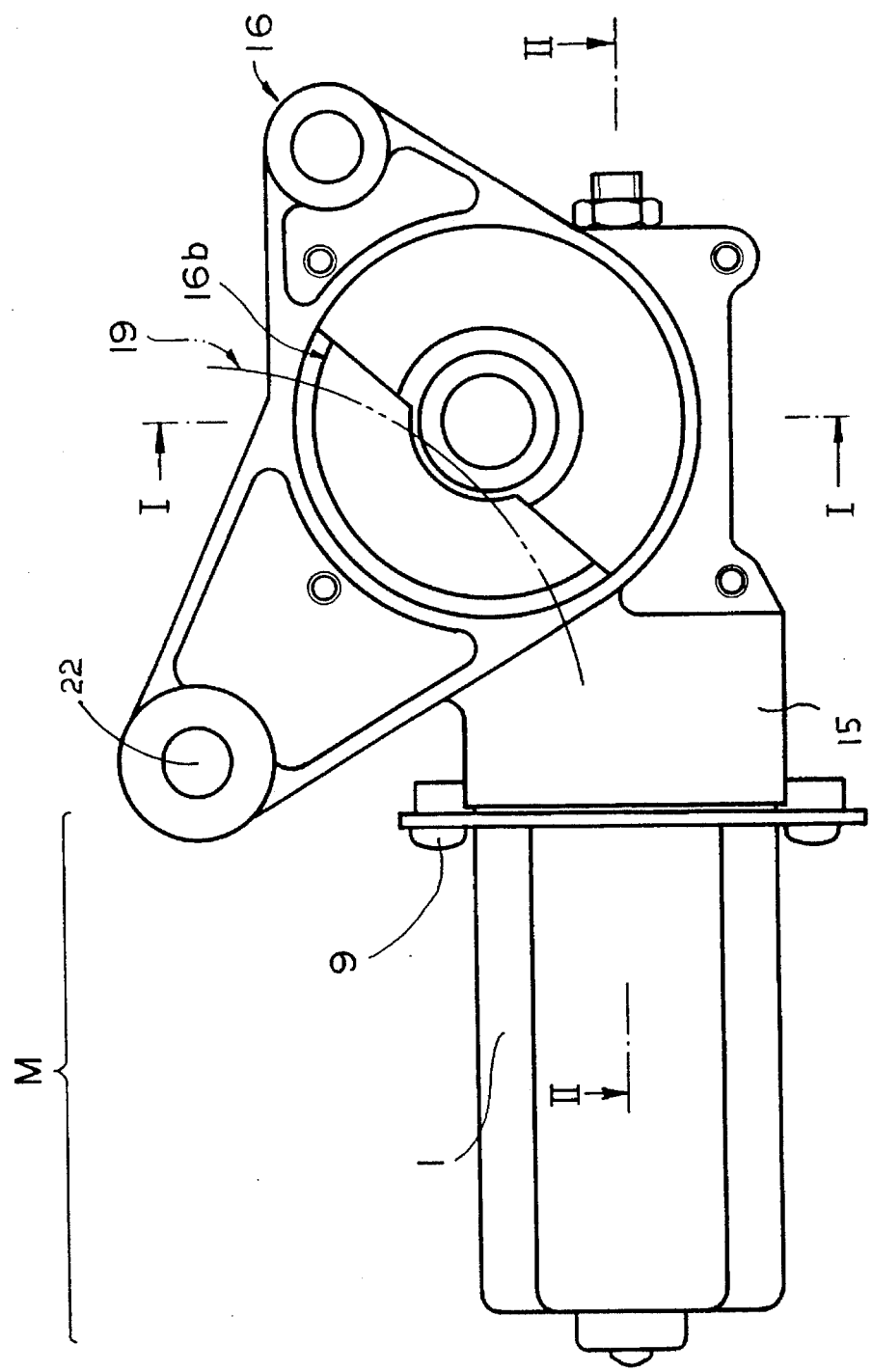
FIG. 4 is a front view illustrating the overall gear reducer.
Figure 5:
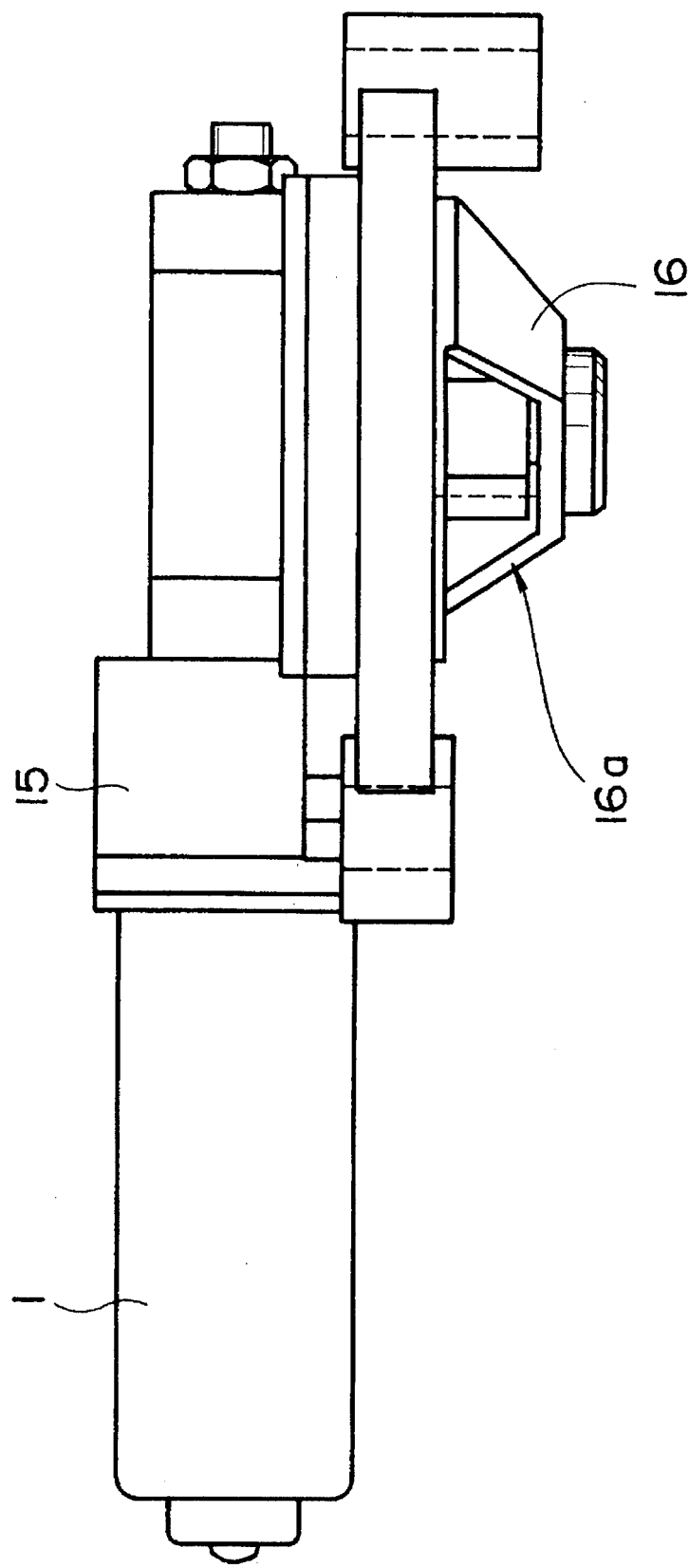
FIG. 5 is a plan view illustrating the overall gear reducer.
Figure 6:
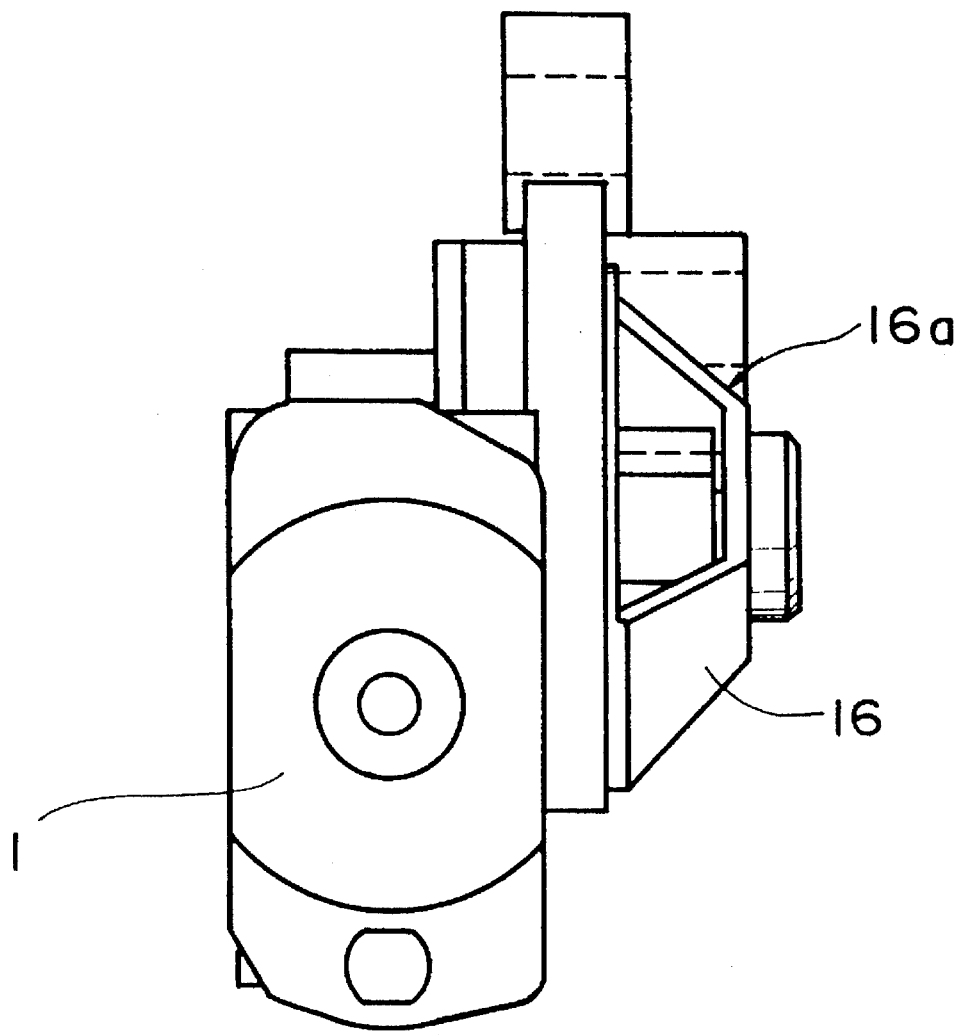
FIG. 6 is a side view illustrating the overall gear reducer.

Here, FIG. 4 is a front view of an overall gear reducer including a motor; FIG. 5 is a plan view thereof; FIG. 6 is a side view thereof; FIG. 1 is a cross-sectional view taken along line I—I of FIG. 4; FIG. 2 is a cross-sectional view taken along line II—II of FIG. 4; and FIG. 3 is a cross-sectional view taken along line III—III of FIG. 1.

This gear reducer with a motor is mainly comprised of a motor section M, a worm reducing section W, and a planetary gear reducing section P of a trochoid-tooth-profile inscribing type.

A description will be given hereafter in order.

As shown in FIG. 2, a motor 1 of the motor section M is coupled to a casing 15 on the worm side by means of motor mounting screws 9 (shown in FIG. 4). A motor shaft 1a of the motor 1 and an end face of an input shaft 2 of the gear reducer are coupled to each other in a mutually abutting state by means of a shaft Joint 3.

The input shaft 2 is supported on both sides by a second pair of metal bearings 5. A worm pinion 4 is disposed at a central position between the pair of metal bearings 5. As is apparent from FIG. 2, the input shaft 2 and the worm pinion 4 are integrated in this embodiment.

The input shaft 2 (and the worm pinion 4) are supported on both sides in the worm-side casing 15 by the metal bearings 5 in such a manner as to be rotatable and movable in the axial direction. This moving and positioning of the input shaft 2 in the axial direction is realized by a steel ball 6, an adjusting screw 7, and an adjusting nut 8 which are disposed on the other end face side of the input shaft 2. That is, the steel ball 6 bites into the axis of the input shaft 2 at the other end face thereof by about half, and the axial position of the steel ball 6 relative to the input shaft 2 is adjusted such that a zero clearance or a very small clearance close to zero is formed by the adjusting screw 7 and the adjusting nut 8. Accordingly, when the motor 1 is rotated forwardly and reversely, and force acting in the reciprocal direction of thrust is applied to the input shaft 2 by means of the worm pinion 4, the input shaft 2 is prevented from unnecessarily moving in the direction of thrust due to that force, and rotation of the input shaft 2 is not hampered at all.

The aforementioned components are assembled in advance into the worm-side casing 15 as a subassembly.

As shown in FIG. 1, a pinion shaft (output shaft) is rotatably supported by a pair of metal bearings 17 in such a manner as to straddle both the worm-side casing 15 and a planetary-side casing 16. On the input side on this pinion shaft 14, a helical worm wheel 10 which meshes with the worm pinion 4 is provided rotatably on an outer periphery of the pinion shaft 4, and an eccentric member 11 spline coupled to the helical worm wheel 10 is provided rotatably thereon. Accordingly, when the helical worm wheel 10 rotates by meshing with as the worm pinion 4, the eccentric member 11 rotates freely on the pinion shaft 14, integrally the helical worm wheel 10.

As shown in FIG. 3, an external gear 12 is rotatably assembled onto an outer periphery of the eccentric member 11. External teeth 12A having a trochoidal tooth profile are formed on an outer periphery of the external gear 12. In addition, a number of inner-pin loosely fitting holes 12b are penetrated the external gear 12 in the axial direction thereof. An internal gear 16a which meshes with the external teeth 12a of this external gear 12 in an inscribing manner is formed on an inner periphery of the planetary-side casing 16.

As shown in FIGS. 1 and 3, a pin flange 13 has cylindrical inner pins 13a projecting integrally toward left side in the drawings in correspondence with the inner-pin loosely fitting holes 12b in the external gear 12, and the inner pins 13a are loosely fitted in the inner-pin loosely fitting holes 12b, respectively.

A low-teeth internal gear 13b with its addenda removed is formed on an inner periphery of the pin flange 13. Meanwhile, at a position corresponding to the low-teeth internal gear 13b, a low-teeth gear 14b of the same specifications is formed integrally on the pinion shaft 14o By allowing the two members to mesh with each other, the pin flange 13 and the pinion shaft 14 are made integral.

Furthermore, a pinion gear 14a is formed integrally on the pinion shaft 14 and meshes with an outside gear (mating gear) 19.

The aforementioned components including the helical worm wheel 10 are assembled in advance into the planetary-side casing 16 as a subassembly.

A notch 16b necessary for the outside gear 19 to mesh with the pinion gear 14a is provided in the planetary-side casing 16 (see FIG. 4).

The worm-side casing 15 and the planetary-side casing 16 have a spigot Joint arrangement 20, are fitted coaxially to each other, and are coupled by means of casing coupling screws 18. In this case, since not an ordinary worm wheel but the helical worm wheel is used for the wheel side of the worm reducing section W, it is possible to prevent a situation in which the teeth of the gears interfere with each other and make the assembly difficult. Accordingly, the casings are coupled very smoothly.

Incidentally, the input-side metal bearing 17, the eccentric member 11, the low-teeth gear 14b, the pinion gear 14a, and the output-side metal bearing 17 are preferably provided with very small axial clearances with each other so that a loss due to the relative rotation and sliding will become very small, or washers which are surface-treated so as to obtain a low coefficient of friction are preferably interposed between the adjacent members, respectively.

Next, a description will be given of the operation of this gear reducer with a motor.

The rotation of the motor shaft 1a of the motor 1 is transmitted to the input shaft 2 by means of the shaft joint 3, which rotates the worm pinion 4 integrated with the input shaft 2. As a result, the helical worm wheel 10 meshing with the worm pinion 4 rotates at a speed based on its speed reducing ratio. Since the helical worm wheel 10 and the eccentric member 11 are spline coupled to each other, the eccentric member 11 rotates around the pinion shaft 14 at the same speed as the helical worm wheel 10.

The action of transmission of power from the eccentric member 11 to the pin flange 13 is basically identical to that of a conventionally known planetary gear structure of the trochoid-tooth-profile inscribing type. That is, when the eccentric member 11 rotates, an inscribed point of the external gear 12, assembled onto its outer periphery, relative to the internal gear 16a moves in correspondence with the eccentric phase of the eccentric member 11. When the eccentric member 11 rotates one time so that the inscribed point of the external gear 12 with respect to the internal gear 16a rotates one time, then the phases of the two gears 12 and 16a offset each other by the difference in the number of teeth of the external gear 12 and the number of teeth of the internal gear 16a (i.e., by 1 in this embodiment).

Here, since the internal gear 16a is fixed (integrated) to the planetary-side casing 16, the phase of the external gear 12 is ultimately offset (rotated) by one tooth each time the eccentric member 11 makes one revolution (with respect to the casing). The external gear 12 undergoes swaying motion around the eccentric member in addition to the rotating motion. However, the swaying component of the external gear 12 is absorbed by means of the loosely fitted inner pins 13a of the pin flange in the inner-pin loosely fitting holes 12b, and only the rotating component is fetched as the rotation of the pin flange 13.

Although in this embodiment the swaying component of the external gear 12 is absorbed by the loose fitting between the inner pins 13a and the inner-pin loosely fitting holes 12b, an arrangement may be alternatively adopted such that the external gear and the flange are coupled to each other by means of an Oldhames coupling so as to absorb the swaying component.

The rotation of the pin flange 13 is transmitted to the pinion shaft 14 because the low-teeth internal gear 13b formed on the inner periphery of the pin flange 13 meshes with the low-teeth gear 14b formed on the pinion shaft 14. As a result, the pinion shaft 14 rotates at the same speed as the pin flange 13.

By the rotation of the pinion shaft 14, the outside gear 19 connected to the backrest side of the reclining seat rotates around a shaft 22 (see FIGS. 1 and 4). Accordingly, when the motor 1 rotates forwardly and reversely, the outside gear 19 is rotated forwardly and reversely through and within the limits of a predetermined angle.

The outside gear section has stoppers (not shown) at the position corresponding to a starting point and a terminating point of the predetermined angle. As the outside gear 19 abuts against the stopper, the load current of the motor 1 increases. The motor 1 is automatically stopped or reversed by detecting by increase in the load current.

Although in this embodiment the pinion shaft 14 and the outside gear 19 is coupled on the inner sides of the pair of metal bearings 17 in order to obtain higher rigidity, the method of coupling the outside member and the gear reducer is not limited to the same. For example, an arrangement may be alternatively adopted such that the pinion shaft 14 is made to project outside the metal bearing 17, and is coupled to the outside member at this projected portion of the pinion shaft 14.

In the gear reducer in accordance with this embodiment, the worm pinion 4 is formed integrally on the input shaft 2 supported on both sides thereof, and all the other component members are supported on the pinion shaft (output shaft) 14 supported on both sides thereof, it is possible to realize high rigidity and high assembling accuracy. As a result, it is possible to ensure high efficiency or high reliability.

In addition, since the worm reducing section W is provided on the input side, the high-speed rotation on the input shaft side is reduced very quietly to a predetermined rotational speed. Furthermore, since the worm reducing section W is provided, even if a large load is applied to the outside gear 19 side, it is possible to prevent the input shaft 2 from being thereby rotated. Namely, the structure has a so-called reverse rotation preventing mechanism.

Since the planetary gear reducing section p of a trochoid-tooth-profile inscribing type is provided on the output side, high rigidity, a large torque, and a high reducing ratio can be realized for the overall reducer. Consequently, it is possible to realize light weight, compact size, and low cost by that section.

Since the rotation of the outside gear 19 in either direction becomes a simple rotation on a single arc around the shaft 22, the output becomes very easy to handle for the reclining seat purposes.

In addition, since not the ordinary worm wheel but the helical worm wheel is used for the wheel side of the worm reducing section W, even if the worm pinion 4 is assembled in advance onto the worm-side casing 15, and even if the other members including the helical worm wheel 10 are assembled in advance onto the planetary-side casing 16, it is easy to unite the two subassemblies.

It should be noted that the gear reducer in accordance with the present invention is applicable not only to the use for a power seat of an automobile, but to the extension use for, for instance, a legless chair and a bed, or for a hinge portion of a reciprocally rotating portion of an advertising robot or an advertising tower.

What is claimed is:

1. A gear reducer for obtaining rotation of an output shaft reducing a rotation of an input shaft, comprising:
   a casing;
   said input shaft;
   said output shaft;
   first and second pairs of bearings in said casing supporting said input shaft and said output shaft, respectively;
   a worm pinion disposed between said first pair of bearings on said input shaft so as to rotate with the rotation of said input shaft;
   a worm wheel rotatably disposed between said second pair of bearings on said output shaft and meshing with said worm pinion;
   a planetary gear structure of a trochoid-tooth-profile inscribing type which is disposed between said second pair of bearings on said output shaft and located adjacent to said worm wheel, said planetary gear structure including an eccentric member rotating with said worm wheel, a trochoid-tooth-profile external gear fitted on an outer periphery of said eccentric member and rotating eccentrically, a trochoid-tooth-profile internal gear secured to said casing and meshing with said external gear in an inscribing manner, and a coupling flange being coupled to said external gear for deriving only a rotating component of said external gear,
   wherein said flange of said planetary gear structure and said output shaft are coupled to each other.

2. A gear reducer for reciprocal rotation according to claim 1, wherein a pinion gear is provided between said second pair of bearings on said output shaft, said pinion gear meshing with an outside gear.

3. A gear reducer for reciprocal rotation according to claim 1, wherein said worm wheel is a helical worm wheel.

4. A gear reducer for reciprocal rotation according to claim 2, wherein said worm wheel is a helical worm wheel.

5. A gear reducer for reciprocal rotation according to claim 1, wherein said external gear of said planetary gear structure has pin fitting through holes arranged in an orbital array on said external gear, said flange has inner pins whose diameters are substantially smaller than the diameter of said pin fitting through holes and which are loosely fitted into said pin fitting through holes, so that only the rotating component of said external gear is transmitted to said flange.

6. A gear reducer for reciprocal rotation according to claim 2, wherein said external gear of said planetary gear structure has pin fitting through holes arranged in an orbital array on penetrated said external gear, said flange has inner pins whose diameters are substantially smaller than the diameter of said pin fitting through holes and which are loosely fitted into said pin fitting through holes, so that only the rotating component of said external gear is transmitted to said flange.

7. A gear reducer for reciprocal rotation according to claim 3, wherein said external gear of said planetary gear structure has pin fitting through holes arranged in an orbital array penetrated on said external gear, said flange has inner pins whose diameters are substantially smaller than the diameter of said pin fitting through holes and which are loosely fitted into said pin fitting through holes, so that only the rotating component of said external gear is transmitted to said flange.

8. A gear reducer for reciprocal rotation according to claim 4, wherein said external gear of said planetary gear structure has pin fitting through holes arranged in an orbital array penetrated on said external gear, said flange has inner pins whose diameters are substantially smaller than the diameter of said pin fitting through holes and which are loosely fitted into said pin fitting through holes, so that only the rotating component of said external gear is transmitted to said flange.

* * * * *